United States Patent [19]

Nakayama et al.

[11] Patent Number: 4,511,764

[45] Date of Patent: Apr. 16, 1985

[54] TELEPHONIC DISPLAY DEVICE

[75] Inventors: Yasunobu Nakayama, Musashino; Yasuji Sato, Hachiouji; Takeshi Kunii, Fuchu, all of Japan

[73] Assignee: Tokyo Shibaura Denki Kabushiki Kaisha, Kawasaki, Japan

[21] Appl. No.: 453,819

[22] Filed: Dec. 27, 1982

[30] Foreign Application Priority Data

Dec. 25, 1981 [JP] Japan .............................. 56-209375

[51] Int. Cl.³ .............................................. H04M 1/26
[52] U.S. Cl. .......................... 179/90 AN; 179/18 BA
[58] Field of Search .......... 179/80 AN, 2 TC, 18 BA, 179/84 L, 81 C, 5.5, 99 LS, 84 VF

[56] References Cited

U.S. PATENT DOCUMENTS 4,267,409 5/1981 Baldoni ........................ 179/90 AN
4,304,968 12/1981 Klausner et al. ............. 179/90 AN Primary Examiner—Stafford D. Schreyer
Attorney, Agent, or Firm—Finnegan, Henderson, Farabow, Garrett & Dunner

[57] ABSTRACT

The display device for a telephone set is designed to be capable of storing in advance the telephone number, person's name, company name, etc. of any desired (one or more) party (subscriber) through the numeric data input means and character data input means which typically use the dial keys of the telephone set, and proper software keys, recognizing the special dial operation made by the user via the specific software keys for telephoning, checking the memory whether the data corresponding to the dialed number is stored, reading the data from the memory if stored, and displaying in the display unit preferably giving the priority to the character data showing the name, company name, etc.

18 Claims, 18 Drawing Figures

TELEPHONIC DISPLAY DEVICE

BACKGROUND OF THE INVENTION

1. Field of the Invention

The present invention relates to the field of display devices associated with the telephone set, and in particular, to a display device capable of displaying the telephone number of a called party and various character information related thereto.

The telephones have come into markedly wide use to the extent that the social life cannot properly function without the telephone. On the other hand, so-called mis-telephoning due to the user's misdialling is on the increase, and effectual preventive measures have been sought.

2. Description of the Prior Art

As one of such measures, a display device whereby the dialed telephone number of the called party is displayed on a proper display unit, and the number is fed back to the caller himself, has been designed recently. This display device, however, has a drawback in that the user cannot immediately make sure that the intended telephone number has been dialed correctly.

The above device may be effective in reducing mis-telephoning when the caller is well-informed of the telephone number of the called party and can clearly identify the called party by the aid of display. However, since only the dialed number is displayed, in the case where the called party cannot be clearly identified by the telephone number, mis-telephoning can still occur.

BRIEF SUMMARY OF THE INVENTION

It is an object of the present invention to provide a telephonic display device capable of greatly reducing mis-telephoning by displaying on the display unit not only the telephone number of the called party but also other information such as the called person's name or company name.

It is a further object of the present invention to provide a telephonic display device with the display unit of minimum capacity and arranged to display the above-mentioned information selectively with priority given to the character information.

In order to achieve the above-mentioned and other objects, the display device of the present invention comprises a memory for storing character data such as the telephone number and the name of the called party, a dot matrix type display unit capable of displaying those data, means inputting numerical information for the dialing operation, means for inputting character information, software keys to store the telephone number information and character information in the memory, and display control means to control the storing of the telephone number information and character information to the memory according to the operation mode of the software keys, the reading of said information from the memory, and the displaying of read-out data and the information fed by said input means to the display unit. That is, the display device is designed so that character information such as telephone numbers and names of one or more subscribers can be stored in the memory in advance via the software keys. When the user performs a specified dialing using specific software keys, this display control means identifies it, checks if the telephone number information and character information corresponding to the dialed number are actually stored in the memory, reads the corresponding telephone number and character information if stored, and displays that information to the display unit visually.

In addition, the display device of the present invention is designed to cause said display control means to display said character information in preference to other information so as to be able to use a miniature display unit of around 11 digits as said display unit. Of course, the information is selectively displayed, and this selection is performed either in a time division manner or by the operation of a proper command key.

According to the present invention, since the called party's name, the company name, etc. can be identified immediately after dialing, mis-telephoning can be reduced greatly.

Furthermore, if abbreviated telephone numbers are used for the specified dialing using a specific software key, the operation of dialing may become simple.

An additional advantage of the display device of the present invention is that since a display unit of small size and capacity can meet the requirement, it can be applied favorably to miniature telephone sets which have recently cone into use.

DETAILED DESCRIPTION OF THE PREFERRED EMBODIMENT

The present invention will be described in detail with reference to the attached drawings.

Figure 1:
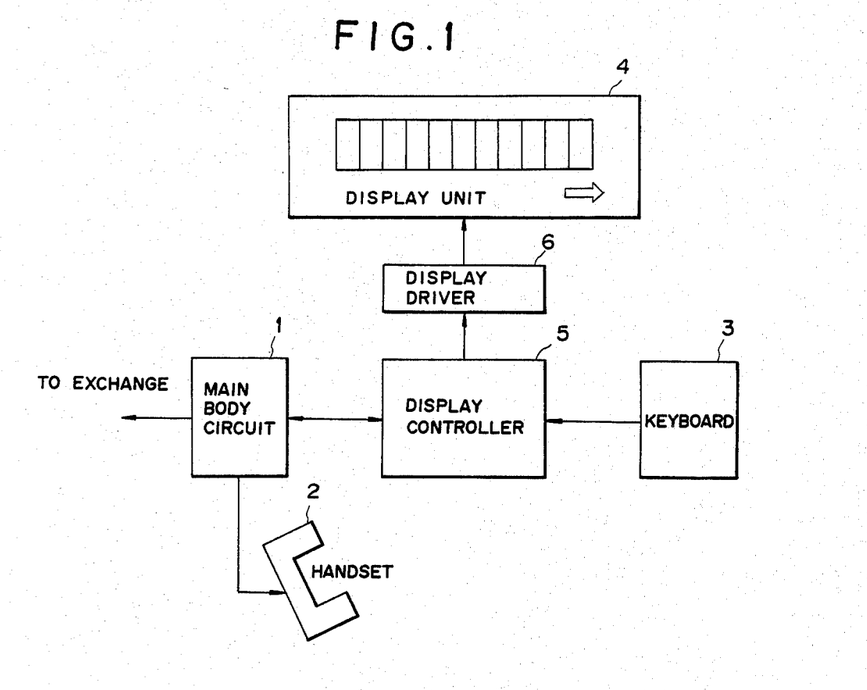
FIG. 1 is a block diagram showing the configuration of a telephone set provided with the display device of the present invention.

Referring now to FIG. 1, the telephone set has, in addition to the essential components of the telephone set including a main body circuit 1 for performing known signal exchange between the telephone and the exchange (not shown), a handset 2 which is a transmitter/receiver, and a keyboard 3 for dialing, an 11-digit LED display unit 4 typically of a 5×7 dot matrix type, a memory for storing data fed via the keyboard 3, a display controller 5 performing the write (load) control of said input data for the memory, read (access) control of data stored in the memory, and specified display control (mentioned later) for the display unit 4 based on the content of said input data, and a display driver 6 for driving the display unit 4 under the control of said display controller. The telephone number corresponding to the display content of the display device is transmitted to the exchange (not shown) via the main body circuit 1.

Figure 2:
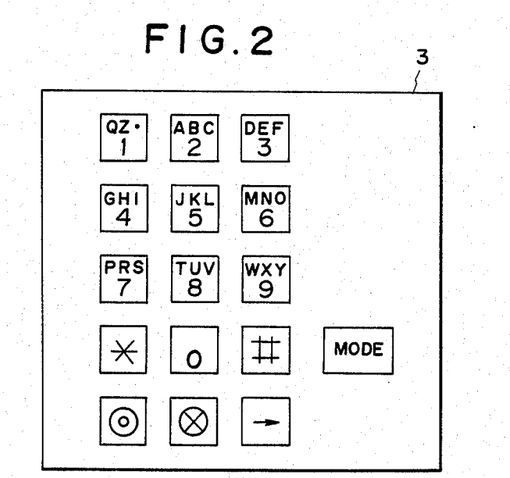
FIG. 2 is a plan showing an example of the key arrangement of the keyboard shown in FIG. 1.

In this embodiment, a plurality of characters/symbols are assigned to each of numeric keys "1" through "9" as shown in FIG. 2, and it is so arranged that upon performing the specified key operation (described later)

each character/symbol can be stored in the memory. That is, characters "Q" and "Z" and symbol ".", characters "A", "B", and "C", characters "D", "E", and "F", characters "G", "H", and "I", characters "J", "K", and "L", characters "M", "N", and "O", characters "P", "R", and "S", characters "T", "U", and "V", and characters "W", "X", and "Y" are assigned to keys "1" "2", "3", "4", "5", "6", "7", "8", and "9" respectively. Since numeric key "0" is used for executing the service sequence of a so-called pushbutton phone as well as performing a special sequence (mentioned later) in this embodiment, no character is assigned. In addition to the above keys, the keyboard 3 is provided with a "*" key to be depressed for starting the execution of various sequences, a software "#" key to be depressed when the sequence has ended, a "MODE" key to be used for the transfer of the mode between the numeric mode and the character/symbol mode via the numeric keys, a software repertory key, i.e., a "⊙" key, which causes the display controller 5 to identify before the execution of display to the display device based on the later-mentioned special number (this is a significant key of the present invention), a software redial key capable of resetting previously dialed telephone number by a single operation, i.e., a "⊗" key, and a selection key, i.e., a "→" key, which is a command key for selecting the display content of the display unit 4.

The display unit 4 can display data of 11-digit symbols/characters simultaneously, and when there is any data which could not be displayed simultaneously, the display unit 4 displays an arrow symbol separately to notify the fact.

Figure 3:
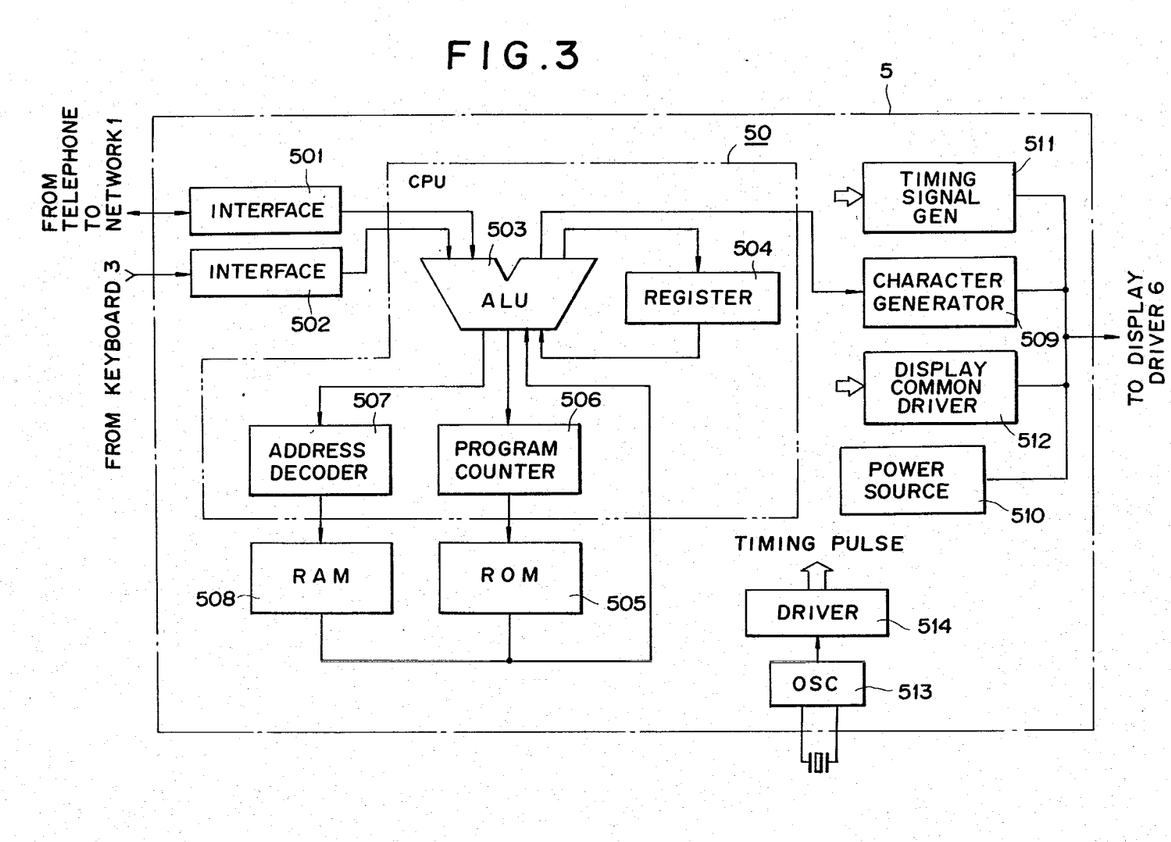
FIG. 3 is a block diagram showing an example of the configuration of the display controller shown in FIG. 1.

As shown in FIG. 3, the display controller 5 mainly consists of a schedule electronic calculator CPU 50 (hereinafter referred to as CPU), which is composed of one chip, e.g., trade name MEMONOTE T6027.

As seen from FIG. 3, the CPU 50 has an arithmetic circuit 503 (hereafter abbreviated as ALU) which is connected to the main body circuit 1 and the keyboard 3 through interfaces 501 and 502 respectively. Further, the CPU is comprised of a register 504 connected so that signals can be input/output between the ALU 503 and register 504, causing the ALU 503 to judge if the specified key of the keyboard 3 has been depressed, and also capable of temporarily storing the later-mentioned special number when input, a program counter 506 connected between a ROM 505 for storing the program table and the ALU 503 and generating a count output for causing the content of the program to be executed step by step, and an address decoder for converting an address signal for the addressing of the data fed to the ALU 503 by the key operation at the keyboard 3. The data fed from the keyboard to the ALU 503 is fed to a RAM 508 according to the address specified by the output from an address decoder 507. The data loaded to the specified address of the RAM 508 and the output data from the ROM 505 are fed to the ALU. The display controller 5 converts the data having undergone the program sequence resulted from the desired key operation judged at the ALU 503 to the character/symbol pattern signal at a character generator 509, and then causes said pattern signal to be displayed at the display unit 4 via a display driver 6. The character generator 509 is driven by a power source 510, and connected also to a timing signal generator 511. A display common driver 512 is provided in the display controller 5 to drive the display common of the display unit 4 when when the output from the character generator is displayed at the display unit 4 as a character/symbol pattern. In addition, an oscillator 513 and a driver 514 for supplying timing pulses to specified components are provided.

The display controller 5 has now been outlined. In the actual use of the telephone set, if the user dialed a special number such as an abbreviated telephone number subsequent to the depression of the "⊙" key, the display unit 4 checks if there is any data prestored in the RAM 508 based on the address signal corresponding to the data to be sent out from the keyboard 3, and operates so as to cause the display section 4 to display the character data preferential to other prestored data, if any, at the same address.

Now, the operation of the entire device of this embodiment will be described.

Figure 9:
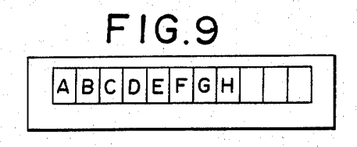
Figure 10:
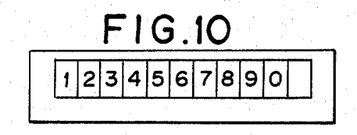
Figure 11:
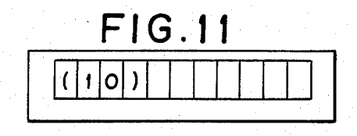
Figure 12:
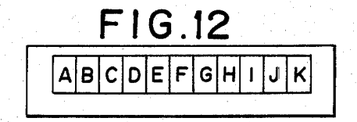
Figure 13:
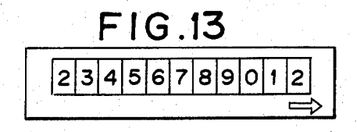
Figure 14:
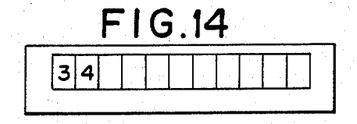

First, the procedure of the operation to write data to the RAM 508, which is the preparatory operation of this device, and an example of operation will be described with reference to FIGS. 3 and 9. This data storage operation is performed with the handset being on-hook.

Now, it is assumed that the other party's name "ABCDEFGH" and the telephone number "1234567890" are to be stored as the abbreviated form "10". In this case, in the telephonic display device of this embodiment, keys are operated in the sequence of "#", "*", "1", "0", "MODE", "A", "B", "C", "D", "E", "F", "G", "H", "MODE, "1", "2", "3", "4", "5", "6", "7", "7", "8", "9", "0", and "#".

Figure 4:
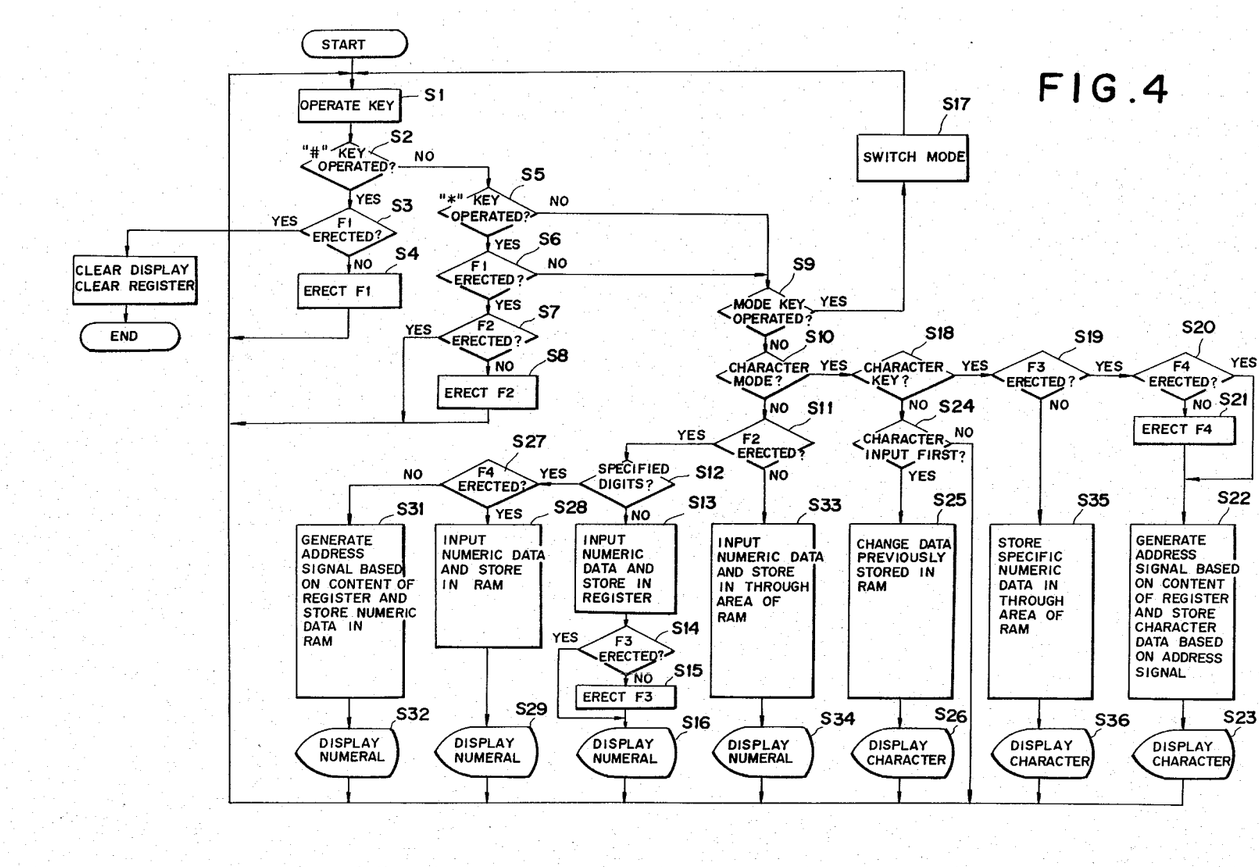
FIG. 4 is a flowchart showing an example of the data storage operation of a preferred embodiment of the present invention.

When keys are operated in the above manner in the step S1 of FIG. 4, the CPU 50 of the display controller 5, in the step S2 identifies the fact that the "#" key has been operated, in the step S3 identifies that the flag "F1" is not yet erected, and in the step S4 erects the flag "F1" in the register 504. Then, as the "*" key is operated, the CPU 50 identifies this fact in the step S5, in the step S6 identifies that the flag "F1" is erected, in the step S7 identifies that the flag "F2" is not yet erected, and in the step S8 erects the flag "F2". Then, as the "1" key is operated, in the same manner the CPU 50 identifies that the operated key is not the "MODE" key in the step S9, in the step S10 identifies that the mode is not the character/symbol mode, in the step S11 identifies that the flag "F2" is erected, in the step S12 identifies that the specified size of numeric information (two digits here) is not stored, providing that the condition is as above, in the step S13, picks up this numeric information "1" and temporarily stores it to the register 504, and then in the steps S14 and S15 erects the flag "F3" in the register 504 after it is identified that the flag "F3" is not erected. The numeric data "1" stored in the register 504 is visually displayed in the display unit 4 through the character generator 509 and the display driver 6. Similar operation is performed when the "0" key is operated. As a result, the numeric data "10" is stored in the register 504, and displayed in the display unit 4. Then, as the "MODE" key is operated, the CPU identifies this fact in the step S9, performs the mode transfer, and in the step S15 processes the subsequent key-in data as character/symbol data. Accordingly, as the next "A" key, i.e., the "2" key, is operated, the CPU 50 generates an address signal corresponding to the numeric data "10" stored in the register 504 and stores the character data "A" in the RAM 508 based on the address signal thus generated (step S22), after identifying that the current mode is the character/symbol mode (step S10), that the operated key is the character key (step S18), that the flag "F3" is erected (step S19), and that the flag "F4" is not erected (step S20), and then erecting the flag "F4" in the register 504. In the device of this embodiment, when the operated key is judged to be the character key, the leftmost character/symbol data of the character/symbol of each key assigned as shown in FIG. 2 is to be picked up. Accordingly, in the above case, data "A" which is the leftmost character of the key "2" is first picked up, and stored at the specified address (in this case address 10) of the RAM 508. With the above, the storing of the character "A" tentatively ends. The character data "A" thus stored is also displayed visually in the display unit 4 through the character generator 509 and the display driver 6 (Step S23). Then, the "B" key is operated. In this case, since the "2" key is operated similarly, the operation similar to the above is repeated. Data "A" is again picked up, stored in the RAM 508, and displayed in the display unit 4. That is, a character data "AA" is stored at an address of RAM 508, and the display unit 4 displays a character data "AA". In such case, in the device of the embodiment, the character is corrected by the operation of the special key "0". That is, as the "0" key is depressed subsequently, the CPU identifies that the "0" key which no character/symbol is assigned to has been operated even in the character/symbol mode (Step S18) and also identifies that the character input has been made first (Step S24). Then, the CPU 50 picks up the data of character/symbol assigned immediately to the right side of the character/symbol first picked up among the character/symbols assigned to the first operated key, and operates so as to store the data thus picked up at the address of the RAM 508 in place of the data first picked up (Step S25). Accordingly, in this case, data "B" which is immediately right side of the character "A" is stored in place of "A". With this, the storing of character "AB" ends. Character "AB" is displayed in the display unit 4 corresponding to the storage content (Step 26). Character "C", "D", "E", "G", and "H" are also stored in the same manner. Actual sequence of storing characters A" through "H" via the numeric keys shown in FIG. 2 is shown in the following table.

TABLE 1

| Character data to be stored | Numeric key operation sequence |
|---|---|
| "A" | "2" |
| "B" | "2" → "0" |
| "C" | "2" → "0" → "0" |
| "D" | "3" |
| "E" | "3" → "0" |
| "F" | "3" → "0" → "0" |
| "G" | "4" |
| "H" | "4" → "0" |

Then, when the "MODE" key is operated, the CPU 50 identifies the fact again in Step S9, and performs the mode transfer in Step S17. That is, subsequent key-in data are processed as numeric data again. Accordingly, when the "1" key is operated next, the CPU 50 identifies that this operation key is not the "MODE" key in Step S9, and then identifies that the mode is not the character/symbol mode in Step S10. Then, the CPU 50 picks up the numeric data "1" provided that the flag "F2" is erected (Step S11), that numeric data of the specified size is stored in the register 504 (Step S12), and that the flag "F4" is erected (Step S27), and stores the data "1" thus picked up in the RAM 508 according to the address signal generated previously (Step S28). That is, the numeric data to be registered here and the character data registered previously are stored at an address of the RAM 508. In this embodiment, in order to facilitate identification of previous character data and this numeric data when these data are read later, a proper identification code should be inserted between these data based on the "MODE" key operation. (This flow is not shown in FIG. 4.) The numeric data stored here is also displayed visually in the display unit 4 through the CPU 50, the character generator 509, and the display driver 6 (Step S29). Numerals "2", "3", "4", "5", "6", "7", "8", "9", and "0" to be fed subsequently will be stored and displayed sequentially in the same manner as above. When all data about the other party have been stored, and the "#" key is operated at the end, the CPU identified this fact in Step S2 and judges if the flag "F1" is erected, and clears the content of the register 504 (Step S30).

Though the illustration is omitted in FIG. 4, when all data to be stored cannot be displayed in the display unit 4 at one time, control is made to effect sequential rewriting from the old display content or displaying unit data of character or numeral alone based on the "MODE" key operation.

Aside from the above example, when only the numeric data corresponding to the other party's telephone number is to be stored, the abbreviated telephone number and the numeric data corresponding to said telephone number are fed from the keyboard. In such case, the CPU 50 identifies that there is no flag "F4" in the character data input (Step S27) after the identification and processing in Steps S12 and S13, and then executes the processing of Step 31. That is, the CPU generates an address signal corresponding to the numeric data of the specified size stored in the register 504, and stores the numeric data in the RAM 508 according to the address signal thus generated. The stored numeric data is also displayed in the display unit 4 through the CPU 50, character generator 509, and display driver 6.

FIG. 4 is a flowchart showing primarily the processing operation of the above-mentioned data. In addition to the above-mentioned memory area (hereafter referred to as storage area), the RAM 508 has a second memory area (hereafter referred to as through area) in which character data or numeric data not desired to be stored in the storage area is temporarily stored by a specific address signal. Thus, data which is not desired to be stored is also displayed to verify the key operation.

That is, when a numeric key is directly operated without the operation of the software key, such as the "#" key and the "*" key, the CPU generates a proper address signal for accessing to the through area of the RAM 508 after identifying that the mode is not the character/symbol mode (Step S10) and further identifying that the flag "F2" is not erected (Step S11), and stores the numeric data to the through area of the RAM 508 (Step S33). The data thus stored is also displayed visually in the display unit 4 through the CPU, the character generator 509, and the display driver 6 (Step S34). Further, when the mode transfer is effected by the "MODE" key and the character key is operated, the CPU identifies that it is currently in the character/symbol mode (Step S10), that the character key is operated (Step S18) and that the flag "F3" is not erected (Step S19). Then, the CPU generates an address signal for the access to the through area of the RAM 508 in the same manner as described above and stores the character data generated by the operation of the character key (Step S35). Similarly, this stored data is displayed visually in the display unit 4 (Step S36). In this case, character correction is performed in the same manner as described previously based on the "0" key operation in Steps S18, S24, S25, and S26.

Assuming that the so far described data storage operation has been repeatedly performed for a plurality of parties and data such as shown in Table 2 have been prestored in the RAM 508, the display control actions of the device of this embodiment at the time of actual use of the telephone will be described with reference to FIGS. 3, 5, and 6–17. The operation described below is performed with the handset 2 (FIG. 1) in the off-hook state.

TABLE 2

| Address | Data |
|---|---|
| 10 | (character data) ABCDEFGH |
|  | (numeric data) 1234567890 |
| 20 | (character data) ABCDEFGHIJK |
|  | (numeric data) 2345678901234 |
| 30 | (character data) |
|  | (numeric data) 3456789012 |
| 40 | (character data) |
|  | (numeric data) |

First, the case when the user depressed keys "⓪", "1", and "0" are depressed to perform abbreviated dial operation for calling the other party "ABCDEFGH" will be described.

Figure 5A:
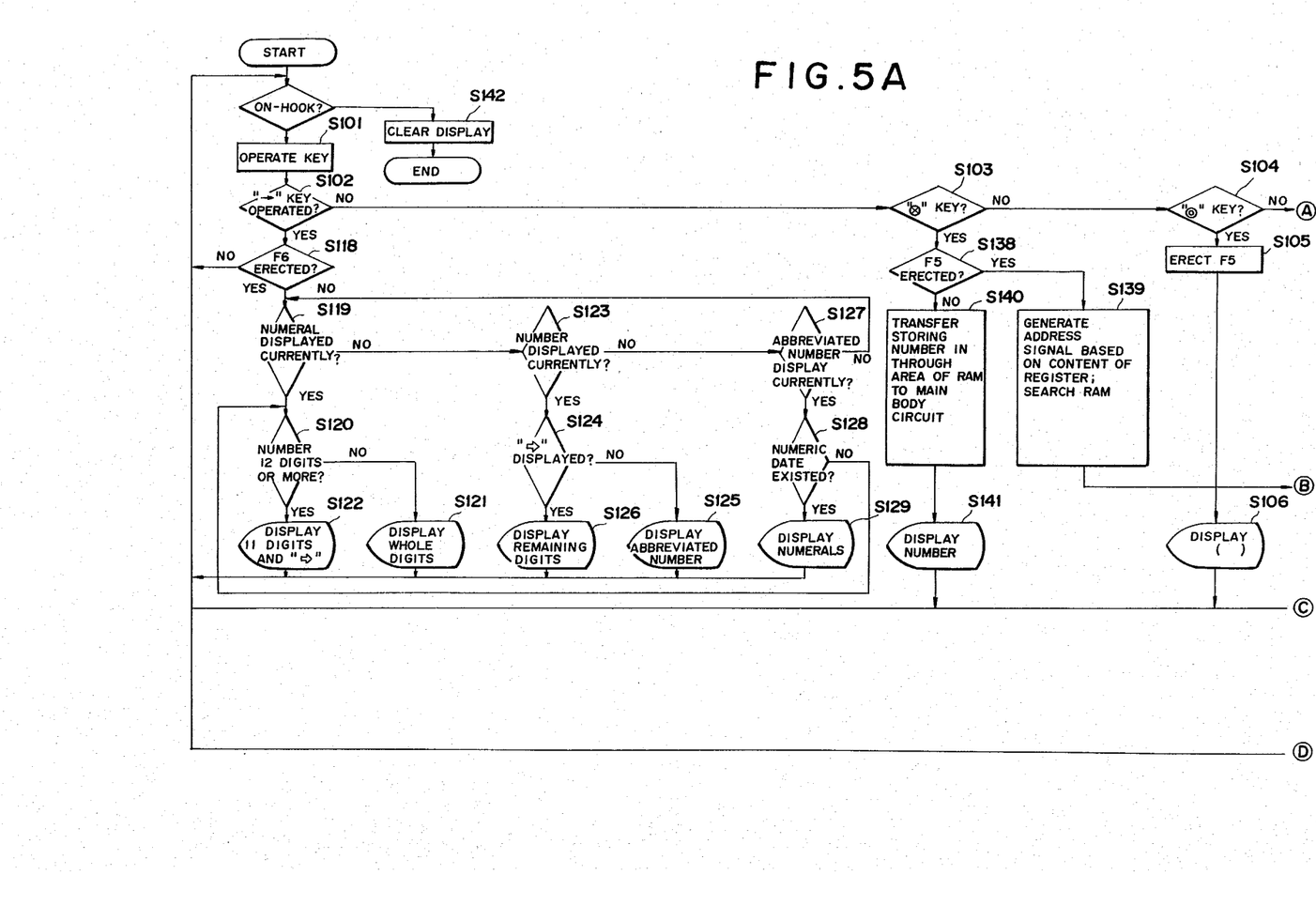
FIGS. 5A and 5B are a flowchart showing an example of a data read and display control operation in a preferred embodiment of the present invention.
Figure 5B:
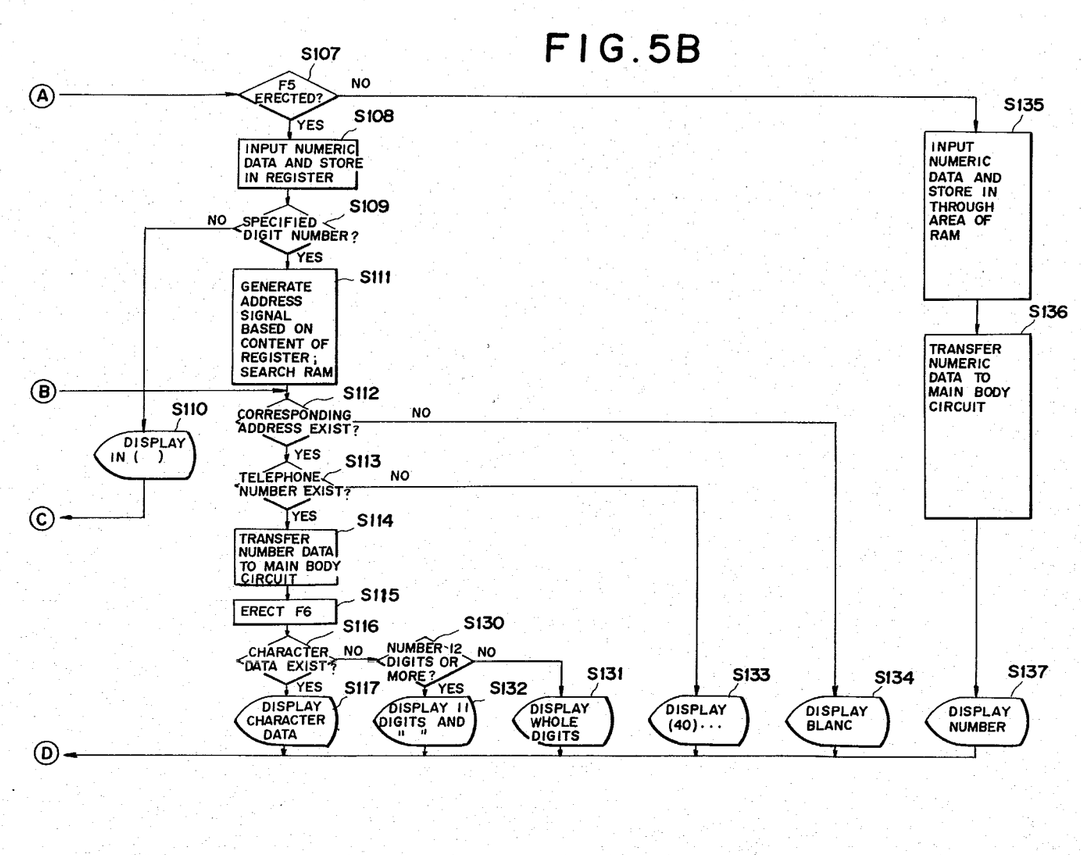
Figure 6:
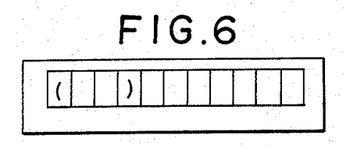
FIGS. 6 through 17 are drawings illustrating examples of display operations resulting from the control shown in FIG. 5 of the display unit shown in FIG. 1.
Figure 7:
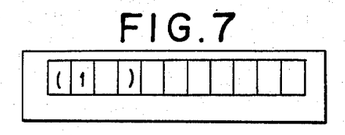
Figure 8:
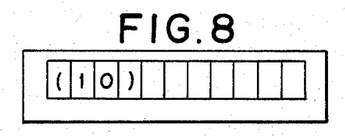

When such key operation is started as Step S101 in FIG. 5, the CPU 50 identifies in Steps S102, S103, and S104 that the first operated key is the "⓪" key, erects the flag "F5" in the register 504 (Step S105), and causes the display unit 4 to display "( )" in the pattern shown in FIG. 6 through the character generator 509 and the display driver 6 (Step S106). Then, when the "1" key is operated, the CPU stores this numeric data "1" to the register 504 temporarily in Step S108 after identifying in Step S107 that the flag "F5" is erected, and causes the display unit 4 to display the stored data until the data reaches the specified size (two digits in this case) in the pattern shown in FIG. 7 (Steps S109 and S110). As the "0" key is operated at the end, the CPU 50 further stores the numeric data "0" to the register 504 (Step S108), identifies that the data stored in the register 504 has become the specified size (display at this time is in the pattern as shown in FIG. 8), generates a specified address signal (address 10 here) corresponding to the stored data "10", and searches the RAM 508 (Step S111). Then, after identifying that there is an address corresponding to said signal in the RAM 508 (refer to Table 2 (Step S112), the CPU verifies if a numeric address is in the RAM 508 (Step S113). In the case of this example, as shown in Table 2, the numeric data "1234567890" is stored at the address, i.e., address 10. Upon identifying this fact, the CPU 50 reads the number "1234567890" from the RAM 508, and transfers it to the main body circuit 1 (refer to FIG. 1) via the interface 501 (Step S119). The circuit 1 sends out a selection signal (PB signal) to the exchange (not shown) based on this number data. The CPU 50 further identifies whether or not a character data is stored at the address of the RAM 508 (Step S116) after erecting the flag "F6" in Step 115. In the case of this example, as shown in Table 2, a character data "ABCDEFGG" is stored. The CPU 50, after judging this fact, reads this character data "ABCDEFGH" from the RAM 508, and causes the display unit 4 to display said character data (Step S117) after erasing the display as shown in FIG. 8. FIG. 9 shows this display pattern. Accordingly, the user can immediately identify the other party's name.

Assume that in this case the user operated the "→" key to visually check the other party's telephone number. In this case, the CPU 50, after identifying this fact in Step S102, cancels the current character data display providing that the flag "F6" is erected (Step S118), a character data is displayed at present (Step S119), and the telephone number is less than 11 digits (Step S120), then reads whole numeric data from the RAM 508, and displays it to the display unit 4 in the pattern shown in FIG. 10 (Step S121). Steps S119 through S129 are a display data selection routine, and the display controller 5 controls so as to switch the display data about the other party each time the "→" key is operated. Accordingly, in this example, when the "→" key is operated again, the CPU 50 cancels the display of the numeric data corresponding to the telephone number, causes the display unit 4 to display the abbreviated telephone number data "10" previously stored in the register 504 in the pattern shown in FIG. 11 (Steps S123–S125), and, when the "→" key is further operated, causes the display unit 4 to display the character data "ABCDEFGH" in the pattern shown in FIG. 9 again (Steps S127–S129).

The case when the user performed the abbreviated dial operation by depressing the "⓪", "2", and "0" keys will be described as the second example.

In this case also, the CUP 50 identifies the "⓪" key (Step S104), erects the flag "F5" (Step S105), generates an address signal indicating the address 20 of the RAM 308 based on the numeric data of the next keys "2" and "0", and searches the RAM 508 (Step S111). In this example, a character data "ABCDEFGHIJK" and a numeric data "2345678901234" are stored at the address 20 of the RAM 508 (refer to Table 2). Upon identifying this fact (Steps S113 and S116), the CPU 50 transfers the numeric data "2345678901234" to the main body circuit 1 (FIG. 1) (Step S114), erects the flag "F6" (Step S115), and causes the display unit 4 to display the character data "ABCDEFGHIJK" in the pattern shown in FIG. 12 (Step S117). The operation up to this point is the same as that of the first example, therefore, the detailed description of intervening operations is omitted.

In the second example, when the user operates the "→" key, the CPU 50, upon identifying this fact (Steps S102, S118, and S119), controls so as to switch display of the display unit 4 from the character display to the numeric display. In this case, numeric data "2345678901234" exceeds the displayable size (number of digits) of the display unit 4. Upon identifying this fact (Step S120), the CPU 50 causes the display unit 4 to display the upper 11-digit data "23456789012" and the "⇒" mark tentatively in the pattern shown in FIG. 13 (Step S122), thus notifying the user of the fact that whole data could not be displayed. As a result, it becomes necessary for the user to operate the "→" key again. Upon identifying that the "→" key has been operated again, the CPU 50 identifies that the numeric data corresponding to the telephone number (Step S123) and that the "⇒" mark (Step S124) are displayed currently, and causes the display unit 4 to display the remaining numeric data "34" in the pattern shown in FIG. 14 (Step S126). Such multidigit telephone numbers are used when the additional equipment such as a PBX (private branch exchange) is provided. The operation resulting from the subsequent "→" key operation is repeated similar to that described previously based on the aforementioned display data selection routine (Steps S119–S129).

In case of character information, when the number of characters is 12 or larger, steps similar to the above-mentioned ones will be taken. Since these steps will be easily understood, the descriptions here and in FIG. 5 on this case are omitted.

The third example where the user performed the abbreviated dial operation appointing address 30 of Table 2 by the depression of the "⓪", "3", and "0" keys will be described. As shown in Table 2, only a numeric data "3456789012" corresponding to the telephone number is stored at address 30.

Figure 15:
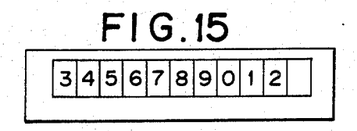
Figure 16:
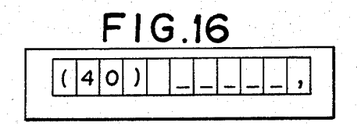

In this case, the CPU 50 erects the flag "F5" (Step S105) recognizing the "⓪" key (Step S104), generates an address signal indicating the address 30 of the RAM 508 based on the numeric data of the subsequent operation keys "3" and "0", searches the RAM 508 (Step S111), transfers the numeric data "3456789012" to the main body circuit 1 (FIG. 1) (Step S114) based on the identification that said data is at the address 30 of the RAM 508 (Steps S112 and S113), then erects the flag "F6" (Step S115), and causes the display unit 4 to display said numeric data in the pattern shown in FIG. 15 (Step S131) based on the judgement that no character data is stored in the RAM 508 and that the numeric data "3456789012" does not exceed 11 digits (Step S130). When the numeric data exeeds 11 digits, the CPU 50 causes the display unit 4 to display the upper 11 digit data and the "⇒" mark (Step S132), thereby urging the user to operate the "→" key. In this case control operation resulting from the " " "→" key operation is preformed in the same manner as described above based on the display data selection routine (Steps S119–S129).

The fourth example where the abbreviated dial operation for appointing address 40 of Table 2 by depressing the keys "⓪", "4", and "0" will be described. As shown in Table 2, neither character data nor numerical data is stored at the address 40.

Figure 17:
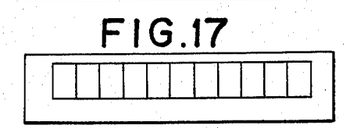

In this case, the CPU 50 erects the flag "F5" (Step S105) upon identifying the "⓪" key similar to the cases so far been described (Step S109), generates an address signal indicating the address 40 of the RAM 508 based on the numeric data of the next operation keys "4" and "0", searches the RAM 508 (Step S111), and causes the display unit 4 to display to the effect that no data is stored in said address in the pattern as shown in FIG. 17 for example (Step S133) upon identifying that no numeric data is stored therein (Step S113).

The fifth example is the case when the user performed the abbreviated dial operation of number "90" depressing the keys "⓪", "9", and "0". There is no address corresponding to the address 90 in the RAM 508.

In this case, the CPU 50 performs the same operation as the previous cases up to Step S111, and searches the RAM 508. Upon identifying that there is no address corresponding to the input data in the RAM 508 (Step S112), the CPU 50 causes the display unit 4 to make blank display in the pattern typically as shown in FIG. 17 (Step S139). As a result, the user comes to know that there is no storage area corresponding to the number of the key operated.

The sixth example where the user performed normal dial operation without performing the abbreviated dial operation will be described.

In this case, upon identifying that the flag "F5" is not erected in Step S107, the CPU 50 stores key-in numeric data to the through area of the RAM 508 sequentially (Step S135), transfers the data thus stored to the main body circuit 1 (FIG. 1) sequentially (Step S136), and causes the display unit 4 to display said data (Step S137). Hence the user can immediately confirm the content of the operated dial visually.

Lastly, the seventh example where the user made redialing by the depression of the "ⓧ" key will be described.

This case, upon identifying that the "ⓧ" has been operated in Step S103, the CPU 50 first checks if the flag "F5" relative to the special number (abbreviated telephone number in this embodiment) input is erected (Step S138). The CPU 50 generates an address signal based on the content held by the register 504 (the register 504 holds the flag resulting from the previous operation and data, and these data are designed to be cleared by, for example, the operation of the "⓪" key or based on the input of a new numeric data), and searches the RAM 508 based on the address signal thus generated (Step S139). Subsequently, the CPU 50 performs the identification and processing after Step 112, transfers applicable numeric data, i.e., the telephone number to the main body circuit 1 (FIG. 1) when said data is in the RAM 508, and causes the display unit 4 to display the data in any of the corresponding pattern of FIGS. 9–17. When, as a result of the identification in Step S138, it is known that the flag "F5" is not erected, the CPU 50 transfers the content held in the through area in the RAM 508 (the through area holds the data resulted from the previous operation, and this data is updated by, for example, a newly fed data or cleared based on the "⓪" key operation) to the circuit 1 (FIG. 1) in Step S140, and causes the display unit 4 to display the content (Step 141). Thus, as the "ⓧ" key is operated, the CPU 50 responds immediately based on the content of previous dial operation, and performs aforementioned display control.

The operation of preferred embodiment has been detailed. In each example, when the handset 2 (FIG. 1) becomes the ON-hook state, the device cancels the display in the display unit 4 that instant (Step S142), and terminates each display control operation described above.

In this embodiment, since the abbreviated telephone number is taken to be the special number to be assigned to the "⓪" key for accessing the stored data, the size (the number of digits) which is taken as the basis of identification is set to two digits, however, this setting is of course optional. Accordingly, as another embodiment, it may be designed that, for example, a proper key, such as "ENTER KEY" is provided to the keyboard 3 to notify the end of word, and the end of the special number is indicated by the operation of said key at the time of data storage, and the end of the special number is specified by said or other suitable key operation at the time of accessing the stored data. By designing as such, monitoring of the size of the special number can be eliminated.

The operation of the embodiment shown in FIGS. 4 and 5 is but an example. That is, various other operation patterns can be implemented according to the configuration of the device. For example, in this embodiment, for making split display, the remaining data is displayed through the operation of the "→" key, however it is also possible to automatically display the remainder of the date after a certain specified period. This may be done by replacing the content of judgement in Step 102 in FIG. 5 with "Has specified period elapsed after key operation?". The CPU has the timer function normally. Instead of using the display method of the present embodiment, it may be desirable to first display the dialed telephone number in the display unit, erase the displayed telephone number when there is text data related to the telephone number, and display that data. This can be realized simply by changing the sequence of programs stored in the ROM 505.

In addition, though this embodiment is designed so that the means for the numeric data input and the means for the character data input are integrated into one set of dial keys of the telephone, keys for each means may be separately provided if the space permits.

What is claimed is:

1. A telephonic display device comprising:
   numeric data input means for inputting numeric data;
   character data input means for inputting character data;
   a first memory for storing said numeric and character data;
   a display unit for displaying said numeric and character data;
   a first software key for causing said numeric and character data to be stored in said first memory;
   first control means for generating address signals based on special number data entered through said numeric data input means in association with telephone number data and character data of a party to be called which is entered through said numeric data input means and said character data input means, respectively, in association with operation of said first software key, and for storing said entered telephone number data and character data in said first memory for said party based on said address signal;
   a second software key for accessing any data stored in said first memory; and
   second control means for generating an address signal based on the special number data when said special number data is entered through said numeric data input means in association with operation of said second software key, for identifying based on said address signal whether said telephone number data and said character data corresponding to said special number data are stored in said first memory, for reading said telephone number data and said character data when the telephone number data and the character data are stored in said first memory, for displaying said stored data on said display unit, and for transferring said telephone number data to said main body circuit of said telephone set.

2. A telephonic display device of claim 1 wherein said numeric data input means and said character data input means comprise a keyboard for dialing operation, and said display device comprises a mode key for switching between a numeric data input mode and a character data input mode.

3. A telephonic display device of claim 1 wherein said second control means causes said display unit to display selectively either said telephone number data or said character data.

4. A telephonic display device of claim 3 wherein said second control means causes said display unit to display said character data in preference to said telephone number.

5. A telephonic display device of claim 4 wherein said display device has a third software key for selecting the data to be displayed, the operation thereof enabling said second control means to control the switching of data to be displayed on said display unit.

6. A telephonic display device of claim 5 wherein said second control means, when said second control means cannot display said selected character or telephone number data in its entirely at a time, causes said display unit to display a mark indicating this fact together, the remainder being caused to be displayed on said display unit based on the operation of said third software key.

7. The telephonic display device of claim 4 wherein said second control means has a timer means for controlling the selecting of data to be displayed on said display unit based on the timing operation of said timer means.

8. The telephonic display device of claim 7 wherein said second control means, when said selected character data or telephone number data cannot be displayed on said display unit in its entirety at a time, causes a mark indicating the fact to be displayed together on said display unit, the remainder being caused to be displayed according to the timing operation of said timer means.

9. The telephonic display device of claim 1 wherein said first control means is responsive to said special number data which is abbreviated telephone number data.

10. A display telephone including a main body for transmitting dialing signals to an exchange, a display unit for displaying stored data, and a memory in which is stored at least one type of data with respect to parties to be called including character type data identifying a party to be called, telephone number type data representative of the telephone number of a party to be called, and special number type data having a smaller number of digits than the telephone number data and used as an index of stored telephone number data, said display telephone comprising;
    a first function key used for displaying data stored in the memory and, if telephone number type data is stored in said memory, for calling a party corresponding to said telephone number type data; and
    control means for searching the memory, when special number type data is inputted following the operation of said first function key, for a memory address corresponding to inputted special number type data and, if data of any type is stored at said address of the memory, for transferring said stored data into said display unit as well as, if telephone number type data is stored at said address of said memory, transferring said telephone number type data into the main body to call a party corresponding to said telephone number type data.

11. The display telephone as claimed in claim 10 wherein said display unit is capable of displaying a predetermined number of digits in a single line.

12. The display telephone as claimed in claim 11 wherein said control means, when two or more types of data are stored at said address out of said character data, telephone number data and special number data, causes either one type of said stored data to be transferred into said display unit.

13. The display telephone as claimed in claim 12 wherein said control means causes said character data to be transferred into said display unit in preference to other types of data if said character data is stored at said address of the memory.

14. The display telephone as claimed in claim 13, further comprising a second function key for instructing the switching of display content on said display unit, the operation of said second function key causing said control means to control the switching of data to be transferred into said display unit.

15. The display telephone as claimed in claim 14 wherein said control means, when said selectively transferred data cannot be displayed in its entirety at one time, causes said display unit to display a mark indicating this fact together with the remaining undisplayed data being transferred into said display unit in response to the operation of said second function key.

16. The display telephone as claimed in claim 15 wherein said control means has a timer means and controls the switching of data to be transferred into said display unit based on the timing operation of said timer means.

17. The display telephone as claimed in claim 16 wherein said control means, when said selectively transferred data cannot be displayed in its entirety at one time, causes said display unit to display a mark indicating this fact together with the remaining undisplayed data being transferred into said display unit based on the timing operation of said timer means.

18. The display telephone as claimed in claim 17 wherein said control means, when at least one of the telephone number data and the special number data is not stored, causes said display unit to display a mark indicating this fact.

* * * * *